United States Patent [19]
Arens

[11] Patent Number: 4,510,978
[45] Date of Patent: Apr. 16, 1985

[54] DOSING APPLIANCE

[75] Inventor: Hans Arens, Wertingen, Fed. Rep. of Germany

[73] Assignee: Grunbeck Wasseraufbereitung GmbH, Hochstadt, Fed. Rep. of Germany

[21] Appl. No.: 477,268

[22] Filed: Mar. 21, 1983

[30] Foreign Application Priority Data

Mar. 24, 1982 [DE] Fed. Rep. of Germany ....... 3210839

[51] Int. Cl.³ .............................................. B65B 31/06
[52] U.S. Cl. ....................................... 141/65; 141/86;
141/284; 222/108; 222/180; 222/416; 248/132;
248/408
[58] Field of Search ................ 211/133; 248/132, 408,
248/423; 141/65, 66, 86, 87, 88, 284, 369-381;
222/83, 108, 180, 416

[56] References Cited

U.S. PATENT DOCUMENTS

| | | | |
|---|---|---|---|
| 1,082,605 | 12/1913 | Niederauer et al. | 141/376 |
| 1,346,434 | 7/1920 | Worster | 141/65 |
| 2,035,808 | 3/1936 | Helmuth et al. | 222/83 |
| 2,125,002 | 7/1938 | Gerdes | 222/83 |
| 2,717,112 | 9/1955 | Ralston | 141/376 |
| 3,911,971 | 10/1975 | Smithson et al. | 141/65 |

FOREIGN PATENT DOCUMENTS 245239 11/1962 Australia ............................ 222/180

Primary Examiner—Houston S. Bell, Jr.
Attorney, Agent, or Firm—Donald Brown

[57] ABSTRACT

A dosing appliance with a suction tube introduceable into a dosing-medium vessel is provided, and by way of this dosing-medium vessels of different shapes can be used. For this purpose, the dosing appliance has a supporting device which carries the dosing-medium vessel and is displaceable for the purpose of exchanging the dosing-medium vessel.

18 Claims, 5 Drawing Figures

DOSING APPLIANCE

BACKGROUND OF THE INVENTION

The invention relates to a dosing appliance with a suction tube introduceable into a dosing medium vessel and with a fastening device. A dosing appliance of this type is used especially for water treatment, dosing medium being added from a dosing-medium vessel to a flowing medium.

German Auslegeschrift No. 1,802,844 makes known a dosing appliance which has on its underside a retaining part which possesses an internal thread matching an external thread provided on a neck of a dosing-medium vessel, so that the dosing-medium vessel can be screwed to the underside of the dosing appliance. The result of this matching is that only a specific form of construction of supply vessels can be used for the dosing appliance.

German Utility Model No. 76 15 753 makes known a dosing appliance with a suction tube which can be introduced into a dosing-medium vessel. The dosing appliance has on its rear side a supporting device, by means of which it can be set on the ground. For connection to a dosing-medium vessel, the entire appliance is lifted, so that the suction tube can be introduced into the vessel. Introduction itself is complicated, and during an exchange the ground can easily be soiled with dosing medium. Furthermore, this arrangement cannot be used when the dosing appliance is to be attached not on the ground, but to the water meter or a water pipe.

OBJECTS OF THE INVENTION

The object of the invention is to provide a dosing appliance of the type described in the introduction, which can also be used for different dosing-medium vessels and which can be attached not only on the ground, but at any height. According to a further development of the invention, the design will be such that, when the dosing-medium vessel is exchanged, soiling of the ground is avoided.

SUMMARY OF THE INVENTION

In accordance with the invention the dosing appliance has a suction tube introduceable into a dosing-medium vessel and a fastening device and a supporting element receiving a dosing-medium vessel provided on the dosing appliance, the distance between the supporting element and the dosing appliance being variable.

BRIEF DESCRIPTION OF THE DRAWINGS

Further features and appropriate aspects of the invention emerge from the description of an exemplary embodiment with reference to the Figures.

In the Figures.

Figures 1, 2:
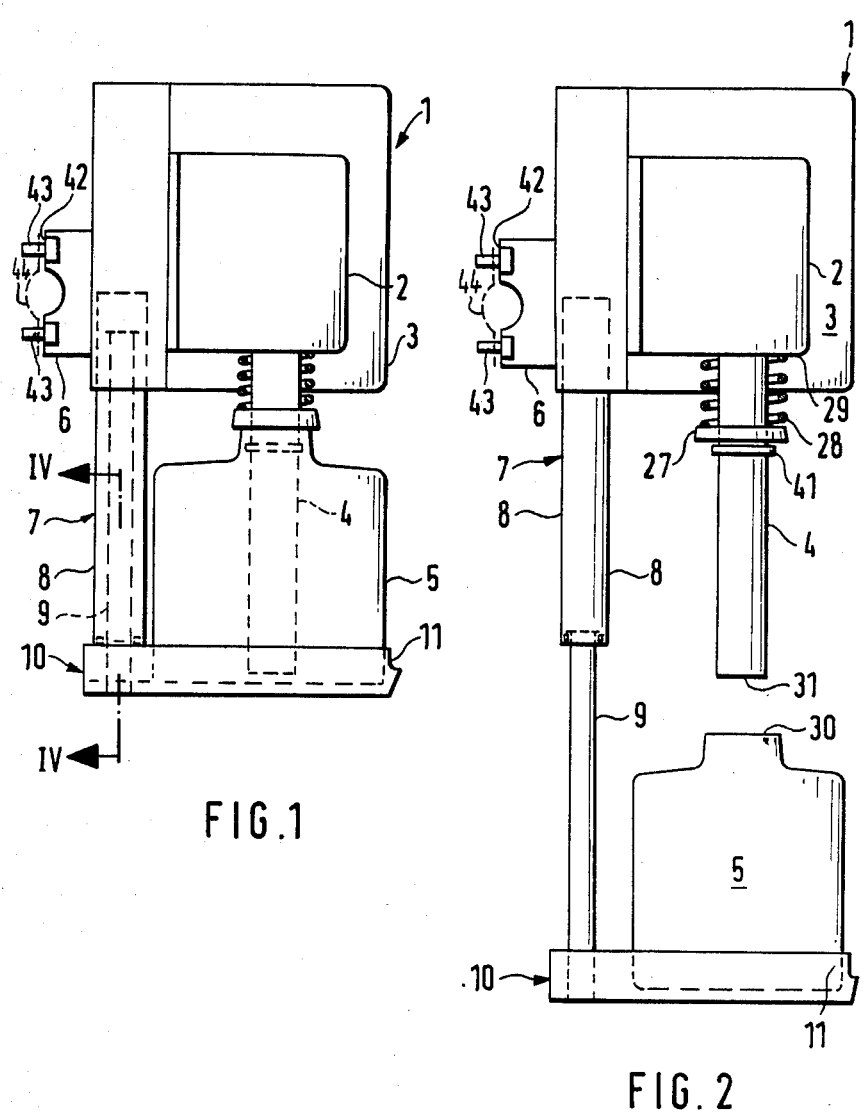
FIG. 1 shows a diagrammatic side view of a dosing appliance with an inserted dosing-medium vessel, in the position of use.
FIG. 2 shows the appliance illustrated in FIG. 1, in a position in which the dosing-medium vessel can be exchanged.

The dosing appliance 1 has conventionally a pump 2, shown diagrammatically, with a drive, these being surrounded with a housing 3. The pump 2 has on its underside a suction tube 4 which hangs down and which serves to be introduced into a dosing-medium vessel 5, in order thereby to feed the dosing medium via the pump in a known way to a medium to be dosed.

The housing can be fastened, for example, to a pipe via an appropriate fastening device 6.

Connected to the housing 3 is a supporting device 7 which is designed as a telescopic drawing mechanism and which extends downwards from the housing 3. The supporting device 7 has a guide tube 8 connected firmly to the housing and a moving tube 9 which can slide in the guide tube. At the lower end of the moving tube 3 facing away from the housing 3 there is a supporting element 10 which extends virtually horizontally and which, as may be seen best from FIG. 3, is designed as a bracket-shaped tray 11 having an edge.

The tray 11 has a supporting surface 12 which is surrounded by an upwardly projecting edge 13, so that liquid dropping onto the tray 12 is collected by the tray.

Figure 3:
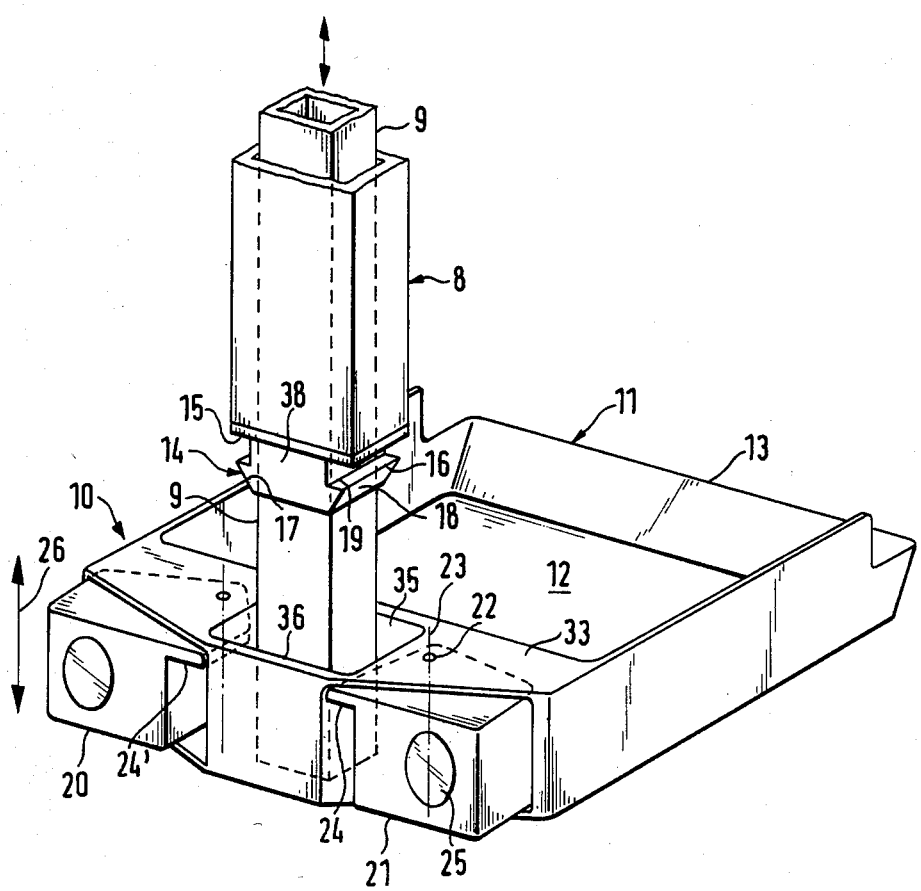
FIG. 3 shows a perspective representation of a detail of the appliance on a larger scale.
Figure 4:
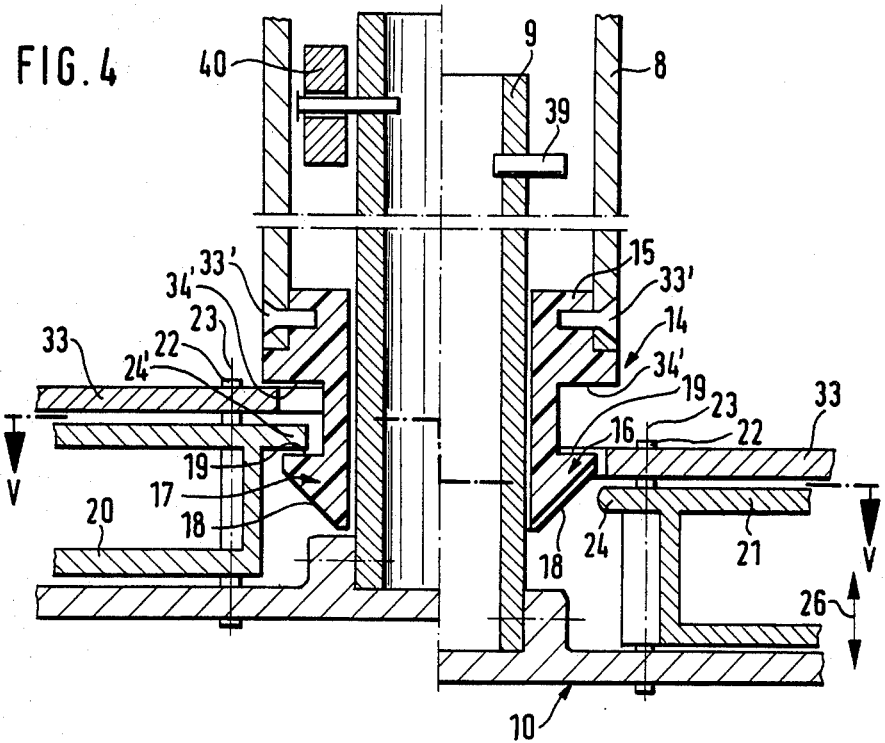
FIG. 4 shows a section through the part shown in FIG. 3, along the line IV—IV in FIG. 1.

As may be seen best from FIGS. 3 and 4, a guide part 14 made of material sliding easily on the moving tube 9, preferably a plastic, is attached to the underside of the guide tube 8 facing the supporting element 10. The guide part 14 has a part 15 which can be connected to the guide tube 8 and which is, for example, inserted from below into the guide tube 8 and held connected to the latter by means of screws 32 or a clamping effect. If desired, gluing can also be carried out. The connection will be a firm one. On its underside, the guide part 14 has two engagement noses 16, 17 which project on opposite sides and which are designed so that, in the way shown in FIG. 3, they have sloping planes 18 extending from the bottom upwards and diverging from the bottom upwards in relation to one another and virtually horizontal retaining planes 19 which limit these.

The supporting element 10 has latches 20, 21 on its side connected to the moving tube 9. The latch 21 is connected to the wall 33 of the supporting element by means of a pin 22, so that it is pivotable about an axis 23 extending parallel to the moving tube 9. There is a tension spring 34 which prestresses the latch 21 into the retaining position shown on the left in FIG. 3 and in FIGS. 4 and 5. At its upper end facing the moving tube 9, the latch 21 has a pawl 24 interacting with the engagement nose 16. The pawl 24 is arranged, in the way shown in FIG. 5, in relation to the axis 23 so that when the latch 21 pivots about the axis 23 the pawl 24 can be moved towards the moving tube 9 and away from this. The body of the latch is designed so that as a result of pressure on a pressure surface 25 it can be pivoted, against the spring force, about the axis 23 from the position shown on the left in FIGS. 4 and 5 into the respective position shown on the right, so that the pawl 24 is disengaged from the engagement nose 16. The latch 20 and its fastening are designed and arranged as mirror images in relation to a plane which extends between the two latches and which coincides with the longitudinal axis of the moving tube 9.

The latches 20, 21 form, together with the engagement noses 16, 17, a two-handed lock. This is shown in the unlocked open state in FIG. 3 and in FIGS. 4 and 5 on the right. When the supporting element 10 is moved upwards in the direction of the arrow 26 towards the guide tube 8 connected fixedly to the housing 3, the inclined planes 18 press the latches 20, 21 slightly outwards at the pawls 24, 24', and in the end position shown on the left in FIGS. 4 and 5 the engagement noses 16, 17 engage under the pawls 24, 24' and form a lock. The lock can only be released by pressing on the two latches 20, 21 at the same time, so that the lock between the pawls and the engagement noses is released, with the result that the supporting element 10 can be moved downwards in the direction of the arrow 26.

Figure 5:
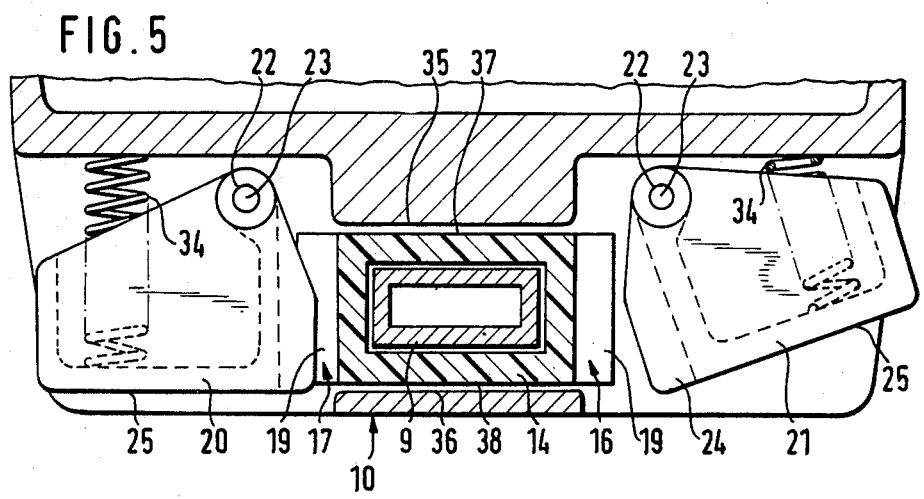
FIG. 5 shows a section through the part shown in FIG. 4, along the line V—V in FIG. 4.

In the upper end position shown on the left in FIGS. 4 and 5, the position of the supporting element is fixed, in the direction of displacement, on the one hand as a result of the engagement of the pawls 24, 24' with the engagement noses 16, 17 and on the other hand because the wall 33 of the supporting element 10 comes up against a bearing surface 34 which is located opposite the retaining plane 19 and is arranged essentially parallel to the latter and which is provided on the guide part 14. In this position, the supporting element 10 is secured against rotation because, as is evident especially from FIG. 5, parrallel guide surfaces 35, 36 connected to the wall 33 engage with side surfaces 37, 38 of the guide part 14 which are arranged essentially parallel to the moving tube. These side surfaces 37, 38 are arranged on two opposite sides of the guide part 14 on which there are no engagement noses 16, 17.

The moving tube 9 and the guide tube 8 are matched with one another so that the moving tube 9 can be extended outwards from the guide tube 8 only up to a lower end position shown in FIG. 2. For this purpose, there is, as shown in the right-hand part of FIG. 4, a pin 39 which, in the lower end position, rests against the top side of the guide part 14 and thereby prevents the moving tube 9 from being extended further. According to another embodiment shown on the left in FIG. 4, track rollers 40 are fastened to the moving tube 9, and the moving tube 9 is guided in the guide tube 8 by means of these. These track rollers 40 are arranged at such a height on the moving tube 9 that, in the lower end position, a track roller rests against the top side of the guide part 14 and consequently likewise prevents the moving tube 9 from being extended further. According to a further embodiment not shown, the moving tube can have an upper flanged edge which, in the lower end position, rests on the top side of the guide part 40.

A cover device 27 is provided on the suction tube 4. There is also a compression spring 28 which rests at one end against an abutment 29 and against the other end of which the cover device 27 rests. The compression spring 28 can be connected to the abutment 29 and to the cover device 27, for example, by means of a clamping or screw connection, so that the cover device 27 cannot fall down. A stop 41 is also provided for limiting the downward movement of the cover device 27 on the suction tube.

To use a dosing-medium vessel 5, the lock is first released by pressing on the two latches 20, 21, and the supporting element 10 is moved downwards into the position shown in FIG. 2 as a result of extension of the telescopic connection. Subsequently, the dosing-medium vessel 5 is placed on the tray 11, and the supporting element 10 is then pushed back upwards into the position shown in FIG. 1. At the same time, the cover device 27 comes in contact with the edge 30 of the dosing-medium vessel 5 and is prestressed towards the edge 30 by the compression spring 28 so that perfect sealing-off is ensured. When the empty dosing-medium vessel is exchanged, unlocking and the downward movement of the supporting element 10 into the lower end position take place again in the way described above. The dosing-medium vessel 5 can be removed from the supporting element. Drops which still possibly fall from the suction tube 4 pass onto the tray 11 so that the ground is not soiled.

The length of the telescopic drawing mechanism consisting of the guide tube 8 and the moving tube 9 is selected so that, in the retained upper end position shown in FIG. 1, the lower end of the suction tube 4 is located just above the bottom of the dosing-medium vessel 5. In the extended state shown in FIG. 2, the distance between the top edge 13 of the tray 11 and the bottom edge 31 of the suction tube 4 should be at least as great as the height of the dosing-medium vessel 5 to be fitted in. According to a further development, there are, in each case, two or a multiplicity of upper and lower end positions, so that vessels of different heights can be used.

The fastening device 6 serves for fastening the dosing appliance 1 so that it is suspended fixedly on a pipe or a wall, in such a way that the space under the dosing appliance is freely accessible for changing the dosing-medium vessel 5 and so that this change is not impeded, for example, by a supporting frame. For this purpose, the fastening device 6 is preferably designed as a retaining shackle fastened to the housing 3, fastening screws 43 being provided at the free ends 42 projecting from the housing 3. As a result, it is also possible to fasten the dosing appliance at a height at which it is easily possible to change the dosing-medium vessel.

When the dosing appliance is to be suspended on a pipe, pipe clips 44 are additionally provided at the free ends 42 and are connected to the retaining shackle of the fastening device 6 by means of the fastening screws 43.

According to another embodiment, the cover device 27 can also be made in one piece together with the compression spring 28, for example as a concertina made of elastic material, preferably rubber. The concertina is connected at one end to the underside of the pump 2 and extends downwards from the latter over the upper part of the suction tube 4. Its length is such that the underside forming an annular resting surface rests resiliently against the edge 30 of the dosing-medium vessel 5 when the latter is in the position corresponding to the second distance. In this case, there is no need for the stop 41.

It should be understood that the above description is in no way limitative and that many modifications may be brought to the embodiment disclosed without departing from the true spirit of the invention.

What is claimed is:

1. A dosing appliance comprising a housing; a pump means within said housing; a suction pipe extending from said pump means downwards out of said housing; fastening means for fixedly mounting said housing; and supporting means for supporting a dosing-medium vessel, wherein said supporting means comprises a supporting element for receiving the dosing-medium vessel and a supporting device extending downwards from said housing and connecting said supporting element with said housing, and wherein the length of said supporting device is adjustable, whereby the distance of said supporting element from said suction pipe may be adjusted to a predetermined value.

2. The dosing appliance comprising a housing; a pump means within said housing; a suction pipe extending from said pump means downwards out of said housing; fastening means for fixedly mounting said housing; and supporting means for supporting a dosing-medium vessel, wherein said supporting means comprises a supporting element for receiving the dosing-medium vessel and a supporting device extending downwards from said housing and connecting said supporting element with said housing, wherein the length of said supporting device is adjustable, whereby the distance of said supporting element from said suction pipe may be adjusted to a predetermined value and wherein said supporting element is adjustable to a first porition, in which the distance between said supporting element and said suction tube is at least equal to the height of a dosing-medium vessel to be received, and to a second position, in which said suction tube extends sufficiently far into said dosing-medium vessel.

3. The dosing appliance of claim 1, wherein said supporting device comprises a telescopic drawing mechanism.

4. The dosing appliance of claim 2, comprising locking means to keep said supporting element engaged in the second position.

5. The dosing appliance of claim 4, wherein said locking means comprises a two-handed lock.

6. The dosing appliance of claim 4, wherein said supporting device comprises a telescopic drawing mechanism.

7. The dosing appliance of claim 6, wherein said locking means comprises a two-handed lock.

8. The dosing appliance of claim 1, wherein said supporting element comprises a tray.

9. The dosing appliance of claim 8, comprising locking means to keep said tray engaged in said second position.

10. The dosing appliance of claim 9, wherein said locking means comprises a two-handed lock.

11. The dosing appliance of claim 1, comprising cover means on said suction tube, said cover means sealing off the edge of a dosing-medium vessel to be received by said supporting element, when said supporting element is in said second position.

12. The dosing appliance of claim 11, comprising a compression spring urging said cover means towards said supporting element.

13. The dosing appliance of claims 12, wherein said supporting element comprises a tray.

14. The dosing appliance of claim 1, wherein the fastening means comprises a retraining shackle for the fixed suspension of the dosing appliance.

15. The dosing appliance of claim 14, comprising locking means to keep said supporting element engaged in said second position.

16. The dosing appliance of claim 14, wherein said supporting element comprises a tray.

17. The dosing appliance of claim 16, comprising cover-means on said suction tube, said cover means sealing off the edge of a dosing-medium vessel to be received by said supporting element, when said supporting element is in said second position.

18. A dosing appliance comprising a housing; a pump means within said housing; a suction pipe extending from said pump means downwards out of said housing; fastening means for fixedly mounting said housing; and supporting means for supporting a dosing-medium vessel, wherein said supporting means comprises a supporting element for receiving the dosing-medium vessel and a supporting device extending downwards from said housing and connecting said supporting element with said housing, wherein the length of said supporting device is adjustable, whereby the distance of said supporting element from said suction pipe may be adjusted to a predetermined value and wherein said supporting element is adjustable to a first position, in which the distance between said supporting element and said suction tube is at least equal to the height of a dosing-medium vessel to be received, and to a second position, in which said suction tube extends sufficiently far into said dosing-medium vessel, said supporting device comprising a guide tube fixedly connected to said housing and a moveable tube slideable in said guide tube, a guide part connected to said guide tube, said guide part having two engagement noses which project on opposite sides, sloping planes extending from the bottom upwards in relation to one another and horizontal retaining planes, said supporting element having first and second pivotal latches having pawls, said pawls interacting with said engagement noses to lock said supporting means in a fixed position, and said latches being pivotally moveable to permit movement of said supporting means.

* * * * *